US010058785B2

(12) United States Patent
Padwick

(10) Patent No.: US 10,058,785 B2
(45) Date of Patent: Aug. 28, 2018

(54) PROFESSIONAL SPORTS PROSPECT MOCK DRAFT CHALLENGE GAME

(71) Applicant: Tobi Padwick, Denton, TX (US)

(72) Inventor: Tobi Padwick, Denton, TX (US)

( * ) Notice: Subject to any disclaimer, the term of this patent is extended or adjusted under 35 U.S.C. 154(b) by 100 days.

(21) Appl. No.: 15/138,994

(22) Filed: Apr. 26, 2016

(65) Prior Publication Data

US 2016/0310851 A1    Oct. 27, 2016

Related U.S. Application Data

(60) Provisional application No. 62/153,240, filed on Apr. 27, 2015.

(51) Int. Cl.
| | |
|---|---|
| *A63F 13/00* | (2014.01) |
| *A63F 13/828* | (2014.01) |
| *A63F 13/35* | (2014.01) |
| *A63F 13/30* | (2014.01) |

(52) U.S. Cl.
CPC ............ *A63F 13/828* (2014.09); *A63F 13/30* (2014.09); *A63F 13/35* (2014.09)

(58) Field of Classification Search
CPC ........ A63F 13/30; A63F 13/31; A63F 13/335; A63F 13/35; A63F 13/70; A63F 13/79; A63F 13/795
See application file for complete search history.

(56) References Cited

U.S. PATENT DOCUMENTS

2009/0186679 A1*  7/2009  Irvine ................... A63F 13/12
                                                                          463/16

OTHER PUBLICATIONS

ESPN.com, 2010 NFL Draft Machine, available at www.espn.com/nfl/draft10/features/draftmachine/index (printed on Sep. 17, 2017, but available online in 2010).*

* cited by examiner

*Primary Examiner* — James S McClellan
(74) *Attorney, Agent, or Firm* — Wei Wei Jeang; Grable Martin Fulton PLLC

(57) ABSTRACT

A fantasy sports mock draft online game portal includes a database coupled to a global computer network and configured to store data associated with game participants, sports teams of at least one sports league, and draft prospects for the sports teams; a webserver accessible via the Internet and in communication with the database, the webserver storing a plurality of web pages, including one depicting a mock draft bracket web page listing the sports teams and corresponding needs of each sports team, the webserver configured to receive game participant draft pick entries specifying draft prospects for the plurality of sports teams and a certain draft order, and storing the drafts pick entries and draft order in the at least one database; and the webserver being further configured to compute a score for each of the game participants based on the draft pick entries in response to a novel scoring methodology.

27 Claims, 14 Drawing Sheets

Make your predictions here.

Enter the prospect ID numbers from the spreadsheet in your predicted slots.

| | TEAM | NEEDS | PREDICTION # |
|---|---|---|---|
| 1. | Tennessee Titans | OT, Pass Rusher, CB | 15 |
| 2. | Cleveland Browns | QB, WR, ILB, DL | 2 |
| 3. | San Diego Chargers | OL, QB, CB, NT, OL | 1 |
| 4. | Dallas Cowboys | QB, CB, OT, RB, DE | 58 |
| 5. | Jacksonville Jaguars | LB, DE, OT, CB | 53 |
| 6. | Baltimore Ravens | WR, DL, RB, OL | 26 |
| 7. | San Francisco 49ers | QB, WR, OL, DL | 34 |
| 8. | Philadelphia Eagles | QB, RB,CB, S, OLB | 3 |
| 9. | Tampa Bay Buccaneer | OL, pass rusher, RB | 35 |
| 10. | New York Giants | CB, DL, OL, ILB | 59 |
| 11. | Chicago Bears | LT, DL, LB, DB | 16 |
| 12. | New Orleans Saints | DT, CB, OLB, QB | 43 |
| 13. | Miami Dolphins | LB, CB, OG, DE | 55 |
| 14. | Oakland Raiders | DL, CB, WR | 80 |
| 15. | Los Angeles Rams | QB, DT,CB, RB, OL | 5 |
| 16. | Detroit Lions | WR, RB,CB, DL, PK | 29 |
| 17. | Atlanta Falcons | DE,TE, DB | 62 |
| 18. | Indianapolis Colts | C, G, DL, ILB, S | 23 |
| 19. | Buffalo Bills | QB, LB, S | 54 |
| 20. | New York Jets | ILB, QB, CB, OT | 4 |
| 21. | Washington Redskins | Pass rusher, DB, OT | 17 |
| 22. | Houston Texans | QB, WR, OT | 18 |
| 23. | Minnesota Vikings | WR, OT, RB, CB | 19 |
| 24. | Cincinnati Bengals | WR, DT, CB, S, PK | 40 |
| 25. | Pittsburgh Steelers | S, DL, CB | 61 |
| 26. | Seattle Seahawks | TE, OL, DT | 41 |
| 27. | Green Bay Packers | Speed WR,ILB, DL,TE | 27 |
| 28. | New England Patriots | WR, DL, RB | 7 |
| 29. | Arizona Cardinals | S, QB, DL, OLB, ILB | 8 |
| 30. | Carolina Panthers | LB, DB, OT | 57 |
| 31. | Denver Broncos | QB, DL, LB, TE/WR | 54 |

League: 1521: The GuildofDraftGurus

League Scoring Settings
All League commisioners can set their individual league's scoring to fit their sensibilities, but the default scoring settings apply in the national competition.

Correct pick of the prospect by the correct team at the correct slot = [10]
The prospect predicted at the right spot/wrong picking team specified = [5]

Bonus points
Evaluation of pereceived talent level

The prospect selected one slot earlier or later = [5]
The prospect selected two slots earlier or later = [4]
The prospect selected three slots earlier or later = [3]
The prospect selected four slots earlier or later = [2]
The prospect selected five slots earlier or later = [1]

Knowledge of NFL
Correctly predicting a team's draft day pick acquisition= [5]

*FIG. 15*

PROFESSIONAL SPORTS PROSPECT MOCK DRAFT CHALLENGE GAME

RELATED APPLICATION

The present application claims the benefit of U.S. Provisional Patent Application No. 62/153,240 filed on Apr. 27, 2015, incorporated herein by reference in its entirety.

FIELD

The present disclosure relates to an online game, and more particularly to a professional sports prospect mock draft challenge game.

BACKGROUND

Fantasy Sports (and particularly Fantasy Football) are heavily played because they are easy to play online and the scoring systems mostly make sense to the participants and rewards their smart decisions. There is both a realized value (ad revenue sales) and an inherent beneficial value to society (social interaction between people of all ages in vast numbers that help to unite our society by underscoring those interest that we share).

Annually NCAA Basketball tournament brackets are filled out in huge numbers because they can be done online or on a paper bracket (ease of use) and the odds are long enough to level the playing field between the sport expert and the kid who has never seen a game before. The NCAA tournament bracket craze offers the same benefits.

BRIEF DESCRIPTION OF THE DRAWINGS

FIG. 4 is an exemplary embodiment of a mock draft printed bracket for the online mock draft game according to the teachings of the present disclosure;

FIG. 10 is an exemplary embodiment of a mock draft bracket screen showing a completed pick list for the online mock draft game according to the teachings of the present disclosure;

FIG. 11 is an exemplary embodiment of a mock draft bracket screen showing a player using a numerical entry method for completing the pick list for the online mock draft game according to the teachings of the present disclosure;

FIG. 15 is an exemplary embodiment of a screen to enable game participants to customize the scoring methodology according to the teachings of the present disclosure.

DETAILED DESCRIPTION

Many professional sports leagues like the NFL (National Football League), NBA (National Basketball Association), MLB (Major League Baseball), and NHL (National Hockey League) undergo an annual player selection process during which teams recruit and pick new team members from among eligible players from collegiate and other leagues. Generally, each team is given a position in the drafting order by a weighted lottery (e.g., NBA), in the reverse order relative to its record in the previous year (e.g., NFL and MLB), or a combination of weighted lottery and prior season's record (e.g., NHL). From the assigned draft order position, each team can either select a player or trade their position with another team for other draft positions, a player or players, or any combination thereof. Each round is completed when each team has used its turn to either selected a player or traded its draft position.

The idea behind this concept is to provide a viral online game that brings people together like fantasy football or the NCAA basketball tournament brackets. The online game described in this disclosure embodies a methodology which would bring all of those elements to competitive mock drafts. The system and methodology described herein not only solve the limitations of popularizing this game—laying out a methodology to allow users to fill out mock drafts and compare their results, as well as participate in a game that can be played by individuals online or groups online or offline—but also establishes a clear goal to drive fan participation: to win this year's "Mock Draft National Championship" in a particular professional sport. Mock drafts have the same long odds as picking an NCAA tournament winner, but there has not been any methodology for an organized game based on the mock draft. The methodology described herein provides a process for players to fill out the mock draft predictions, as well as comparing one's results against others' in terms of scoring. The methodology also provides communication channels for players and groups to relay messages and post private and public notes.

Like Fantasy Football and NCAA Tournament Brackets, the idea of a National Mock Draft Championship competition is rife to be stolen by large corporations. Like those games, once you "know how to do it," replicating a successful version of a nationwide mock draft competition on a website is relatively straightforward and extremely profitable.

Figure 1:
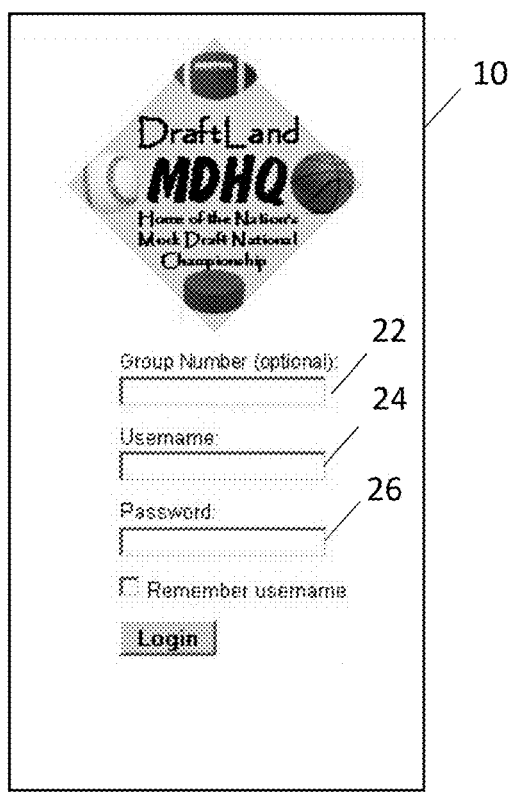
FIG. 1 is an exemplary embodiment of a login screen for the online mock draft game according to the teachings of the present disclosure.
Figure 2:
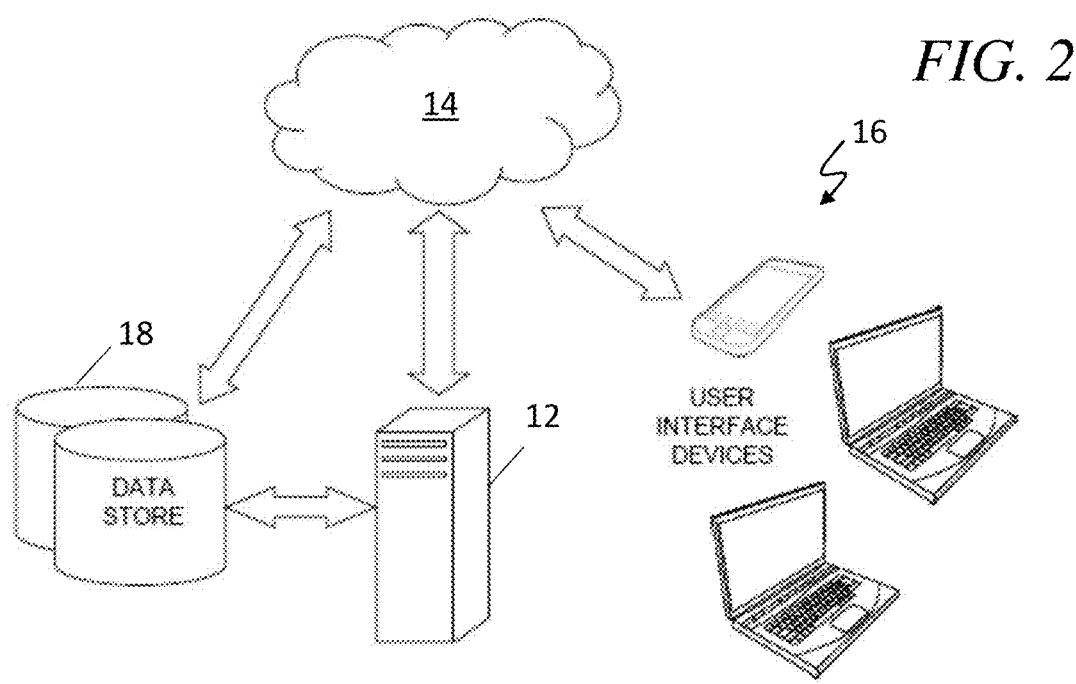
FIG. 2 is a simplified block diagram of an exemplary embodiment of a computer network environment serving the professional sports mock draft challenge game to users according to the teachings of the present disclosure.

FIG. 1 is an exemplary embodiment of a login screen 10 for the online mock draft game according to the teachings of the present disclosure. The login screen 10 is one of many web pages associated with the online mock draft game website/portal that are stored on a web server(s) 12 that is accessible via the World Wide Web 14 by a variety of computing devices 16, such as desktop computers, laptop computers, tablet computers, mobile telephones, wearable computing devices, etc. The game participants may access the web pages via the Internet or another global computer network, as well as WiFi, Local Area Network (LAN), mobile telecommunication network, and other communication networks. The web server(s) 12 may further access and store data in one or more data store 18, including subscriber account and profile information, sports team data, athlete data, sports commentator data, etc. The web server(s) 12 stores web pages that are configured for the desktop/laptop version and the mobile version to optimize viewing and usage on different forms of computing devices 16. The information used for login may include the user's group number or identifier name (if applicable) 22, username 24, and password 26, for example. A user may be a member of or be affiliated with a group of friends who are also playing the game. The user may choose to save the username and/or group number to enable faster login in the future.

Figure 3:
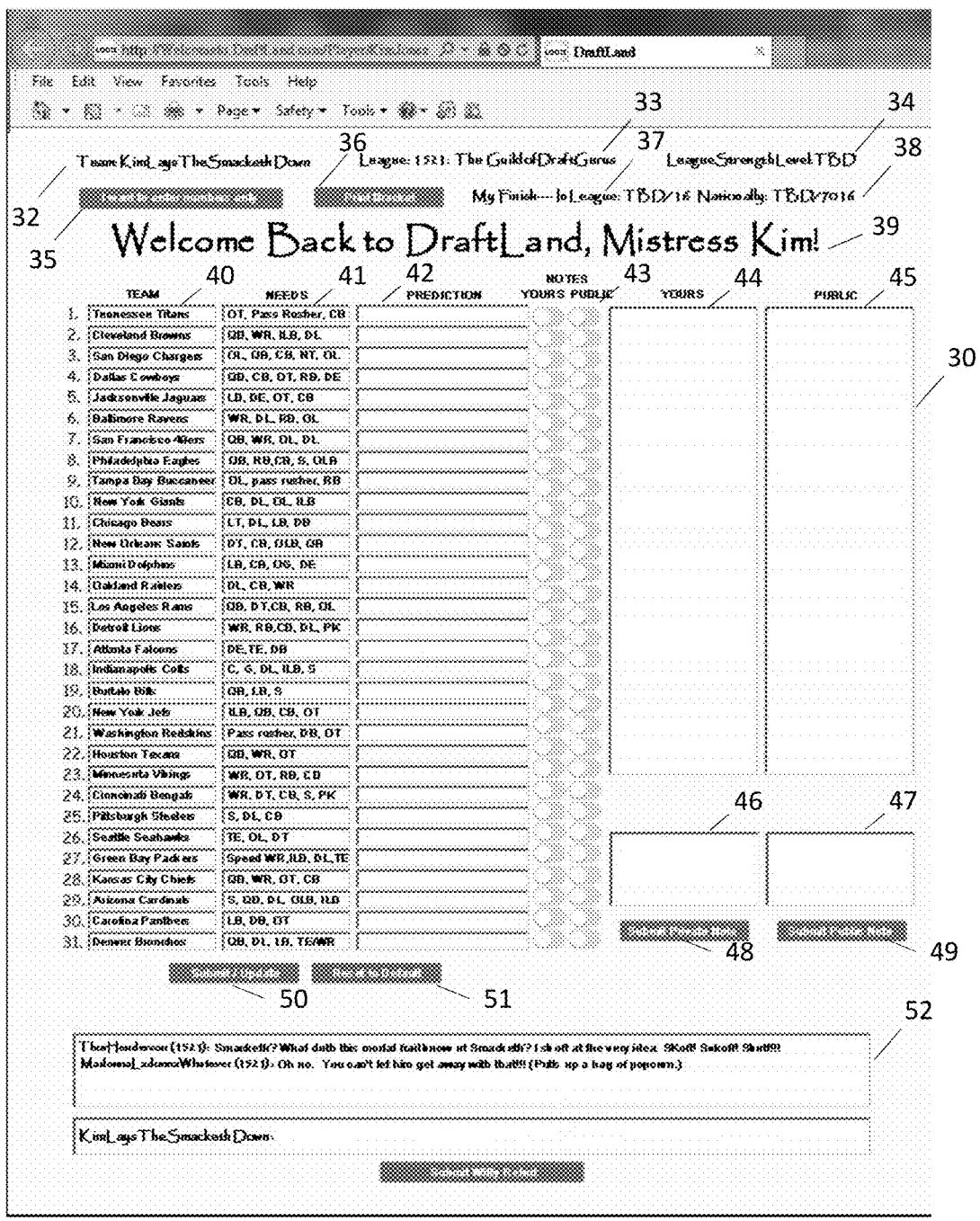
FIG. 3 is an exemplary embodiment of a mock draft bracket screen for the online mock draft game according to the teachings of the present disclosure.

FIG. 3 is an exemplary embodiment of a mock draft bracket screen 30 for the online mock draft game according to the teachings of the present disclosure. Generally, the system may provide the user two options of playing the game. Users can pay a fee to access the site and download the copyrighted draft form 32 (FIG. 4), which permits them to make copies for members of the group. Alternatively, all participants from the group may choose to pay a fee and play online, which gives them the ability to access additional content and use of the online database. The webserver is configured to prompt for, receive, and process payment information.

The website/portal provides information and URL links to relevant articles relating to the sports teams and prospects online. Access to the website gives access to proprietary team-by-team draft process analysis, key front office figures, and number crunching on the teams' draft history. At the mock draft bracket screen 30, gamers may put in their picks by either specifying a number linked to a specific draft prospect or to use targeted drop down lists. The system retains the information for each gamer participant and allows easy modification. The system also stores and displays, on request, a log of user changes so participants can recall past picks and inputs. The system also saves their notes specific to their user number/account.

With reference to FIG. 3, the top line shows user defined team name 32 (e.g., Kim Lays The Smacketh Down), affiliated league of participants 33 (e.g., The Guild of Draft Gurus), and a final "league ranking" 34 based on their average scores vs. other leagues. The second line features buttons: "I want to enter numbers only" button 35 that leads to the quick entry form (FIG. 13), a "print bracket" 36 button which sends a preformatted bracket to a designated printer. Further, the user's finishing place in league 37, and the user's finishing place vs. all contestants in all leagues 38 are displayed. On the third line, a personalized welcome greeting 39 is displayed. The next section lists the NFL teams 40 in the current/default draft order in the left-most column along with their needs 41 in a second column. This is the preferred default setting for this mock draft bracket screen 30. In the third column is a series of blank data fields to enable the user to enter his/her draft predictions. There are also two series of toggle switches 43 that are associated with the private and public notes windows 44 and 45. Below them are notes entry windows 46 and 47, and respective submission buttons 48 and 49. Details of how these personal and public notes operate are described below. At the bottom of the team and needs columns 40 and 41 are a pair of buttons—"submit/update" 50 and "reset to default" 51. These buttons allow the user to submit his/her changes or restore the team draft order list to the default setting. The bottom section 52 is for talking smack with other users in your league. Details are described below.

Figure 4:
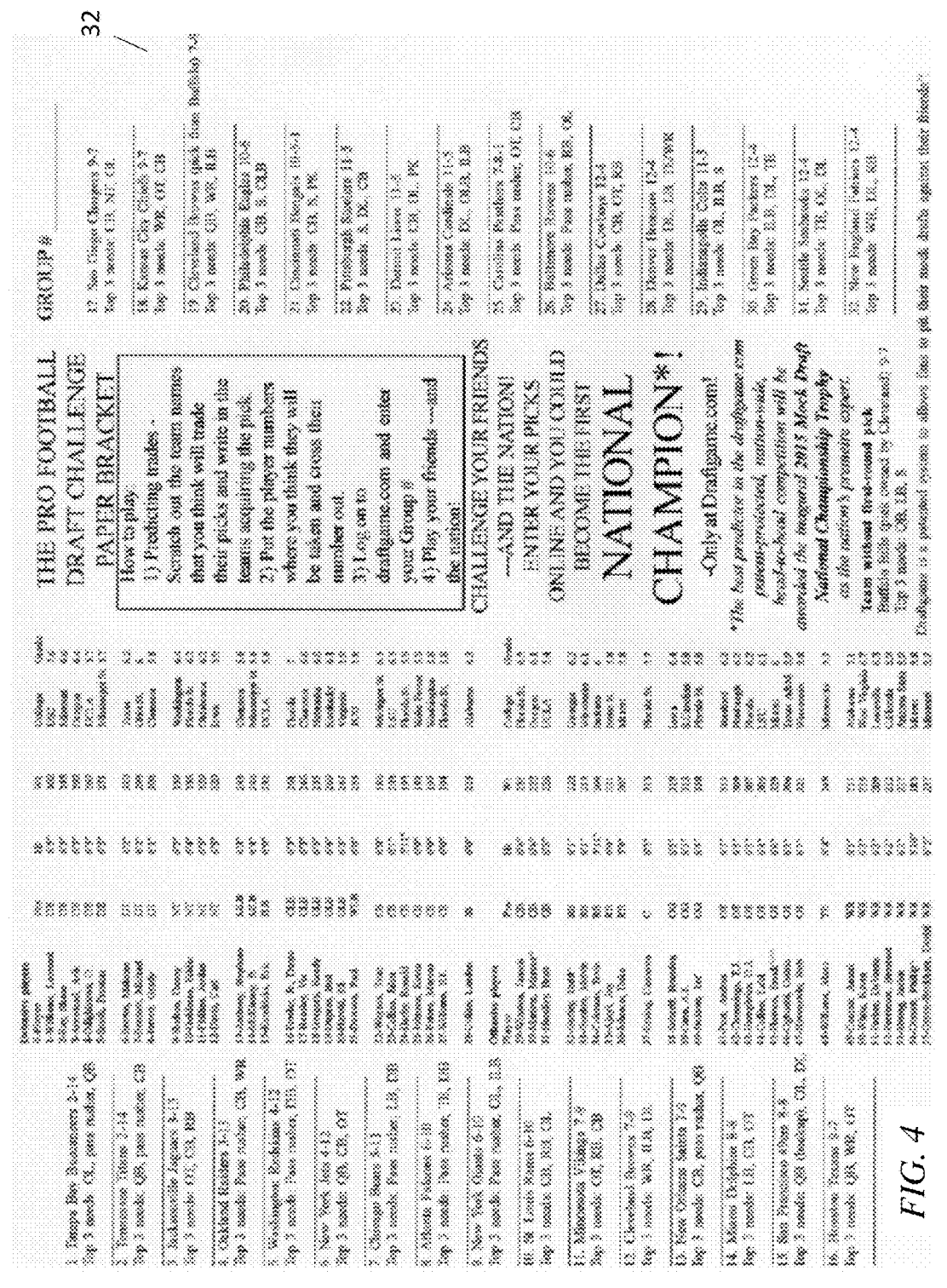

FIG. 4 is an exemplary embodiment of a mock draft printed bracket 32 for the online mock draft game according to the teachings of the present disclosure. The participants may download and print a paper bracket that would have a number of the top prospects listed on a single sheet of paper with slots for participants to designate each prospect they think a team will pick. This is an example of what is produced when a participant clicks on the "print bracket" button. The prospects' ID numbers are specified to allow participants to simply write a number in for each slot. The paper bracket also lists the group number assigned to that group of users. The paper game is a gateway to the online game. The teams are listed in their current or default draft order (with their record from last season and their needs) starting in the left-most column and finishing in the right-most column. The second column is a list of roughly 60 prospects who are likely candidates to be considered by a team in the first round. The last column includes instructions and behavior driving advertising speak. The bracket has several breakthroughs. It is a paper bracket allowing people to consider the mock draft offline. It has all of the likely prospects listed. It includes numbers identifying each prospect, making filling out a bracket a lot faster.

Figure 5:
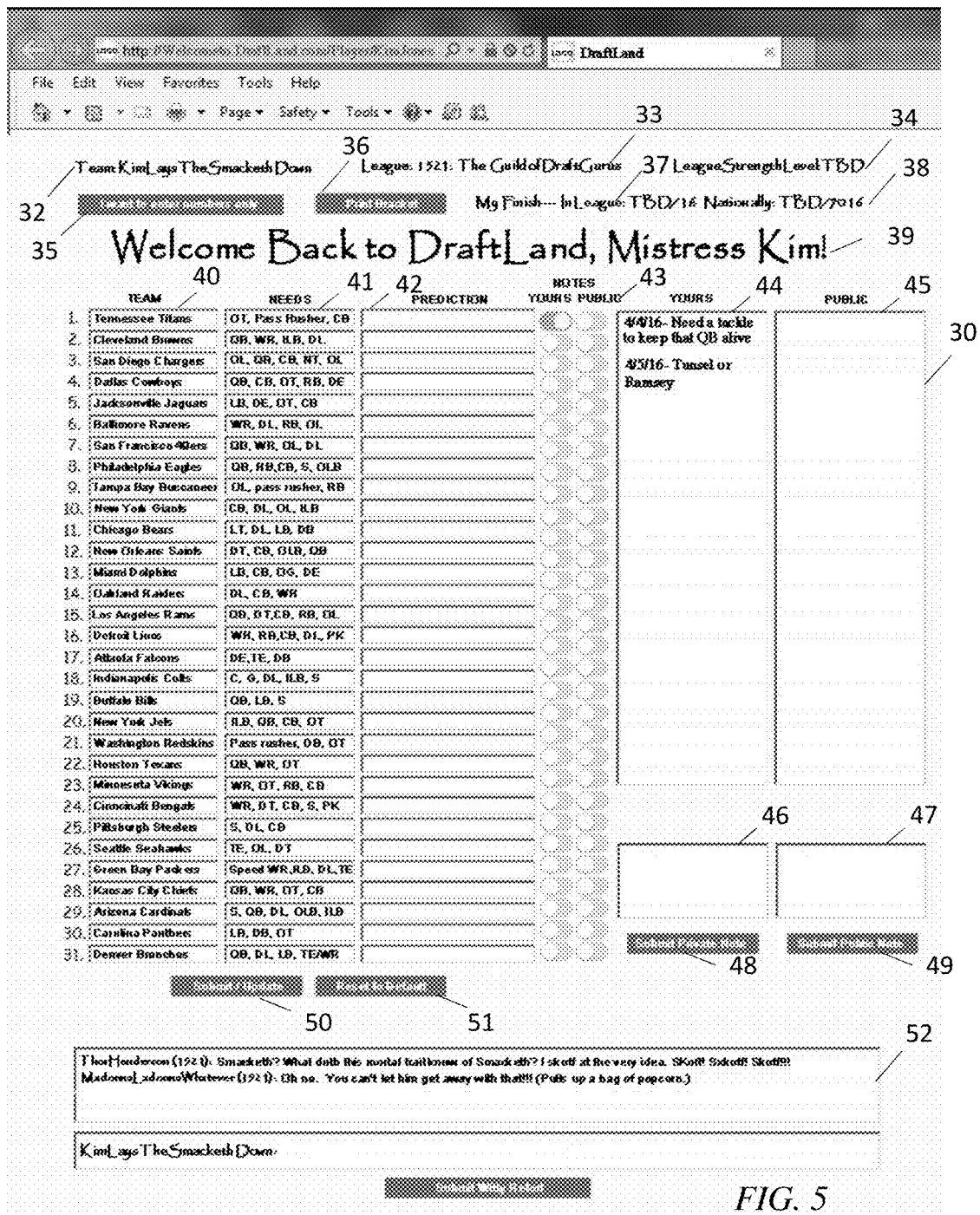
FIG. 5 is an exemplary embodiment of a mock draft bracket screen showing player's personal notes for the online mock draft game according to the teachings of the present disclosure.

FIG. 5 is an exemplary embodiment of a mock draft bracket screen 30 showing player's personal notes for the online mock draft game according to the teachings of the present disclosure. The personal notes display window 44 is dedicated to the user's notes entered as the user contemplates draft choices. The top window 44 displays the personal notes that a user has already recorded. The bottom window 46 and its accompanying submission button 48 provide a data field for the user to enter new personal notes. As you can see in the example, the user has decided to take a look at their personal notes concerning the Tennessee Titans' selection at #1. Users do this by toggling on personal notes switch next to that selection. Only one selection slot can be toggled on at a time to allow the user to focus only on that selection. Personal notes are private and not for viewing by others. The user may also enter public notes that are available for public viewing by using entry window 47 and submission button 49.

In an alternative implementation, a user may select a particular team by clicking on that team's name or needs, thus highlighting or singling out that team's name and needs in columns 40 and 41. By selecting and highlighting a particular team, the private and public notes associated with that team previously entered by the user are displayed for viewing. The user may also enter additional private and public notes for that selected team by using the entry windows 46 and 47 below with the associated submission buttons 48 and 49. When another team is selected, the notes windows are automatically updated to display the notes associated with that newly selected team, if any.

Figure 6:
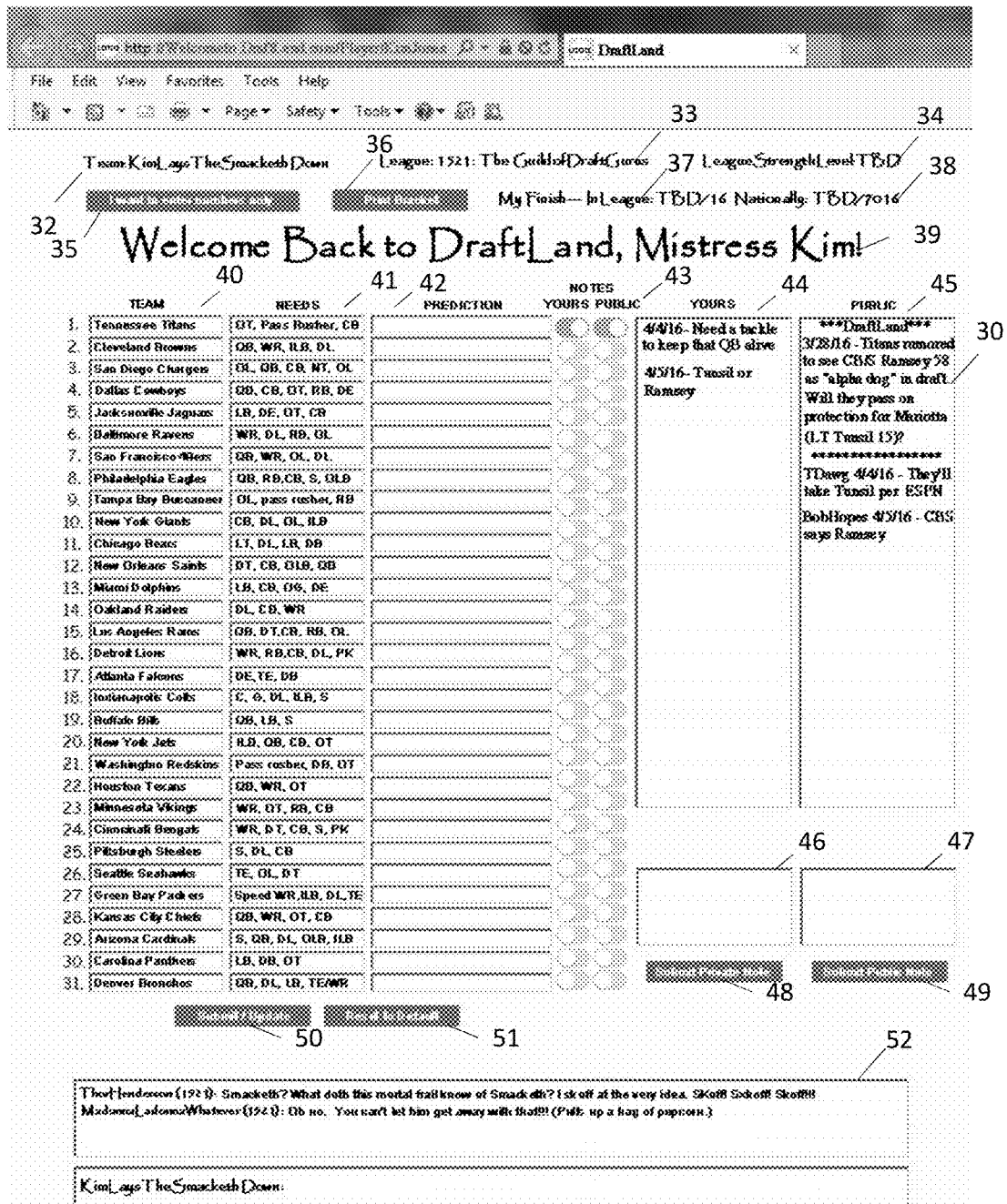
FIG. 6 is an exemplary embodiment of a mock draft bracket screen showing player's public notes for the online mock draft game according to the teachings of the present disclosure.

FIG. 6 is an exemplary embodiment of a mock draft bracket screen 30 showing a user's public notes for the online mock draft game according to the teachings of the present disclosure. The public notes window 45 includes the website operators' insights. The window 45 may also include public notes submitted by other users (from the user's own group or overall).

Figure 7:
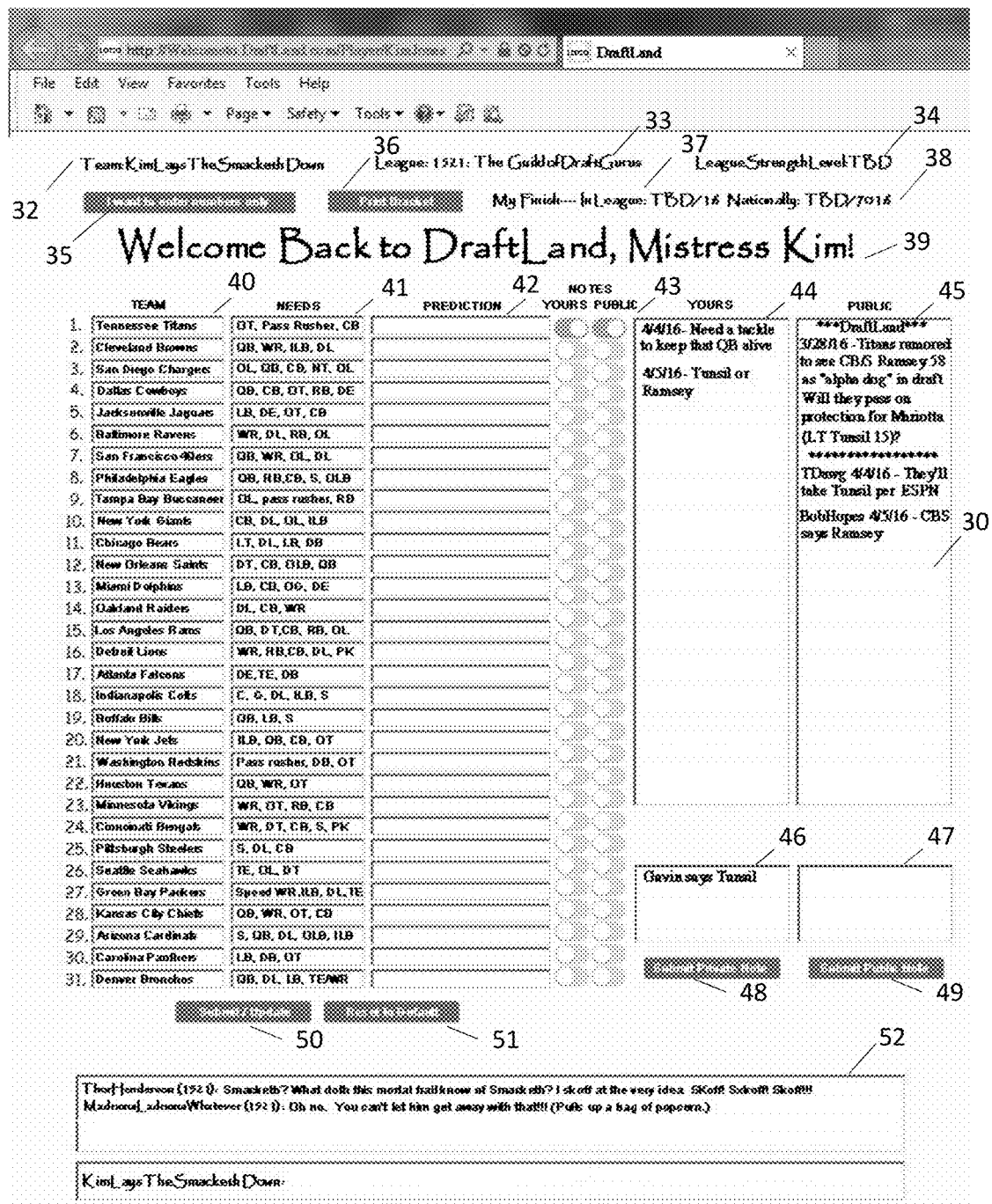
FIG. 7 is an exemplary embodiment of a mock draft bracket screen showing a player adding personal notes for the online mock draft game according to the teachings of the present disclosure.

FIG. 7 is an exemplary embodiment of a mock draft bracket screen 30 showing a player adding personal notes for the online mock draft game according to the teachings of the present disclosure. This example shows the user adding a personal note specific to a certain selection by filling out the data field 46 and clicking the "Submit Private Note" button 48. (Submitting a public note is the same process, just done one column over.)

Figure 8:
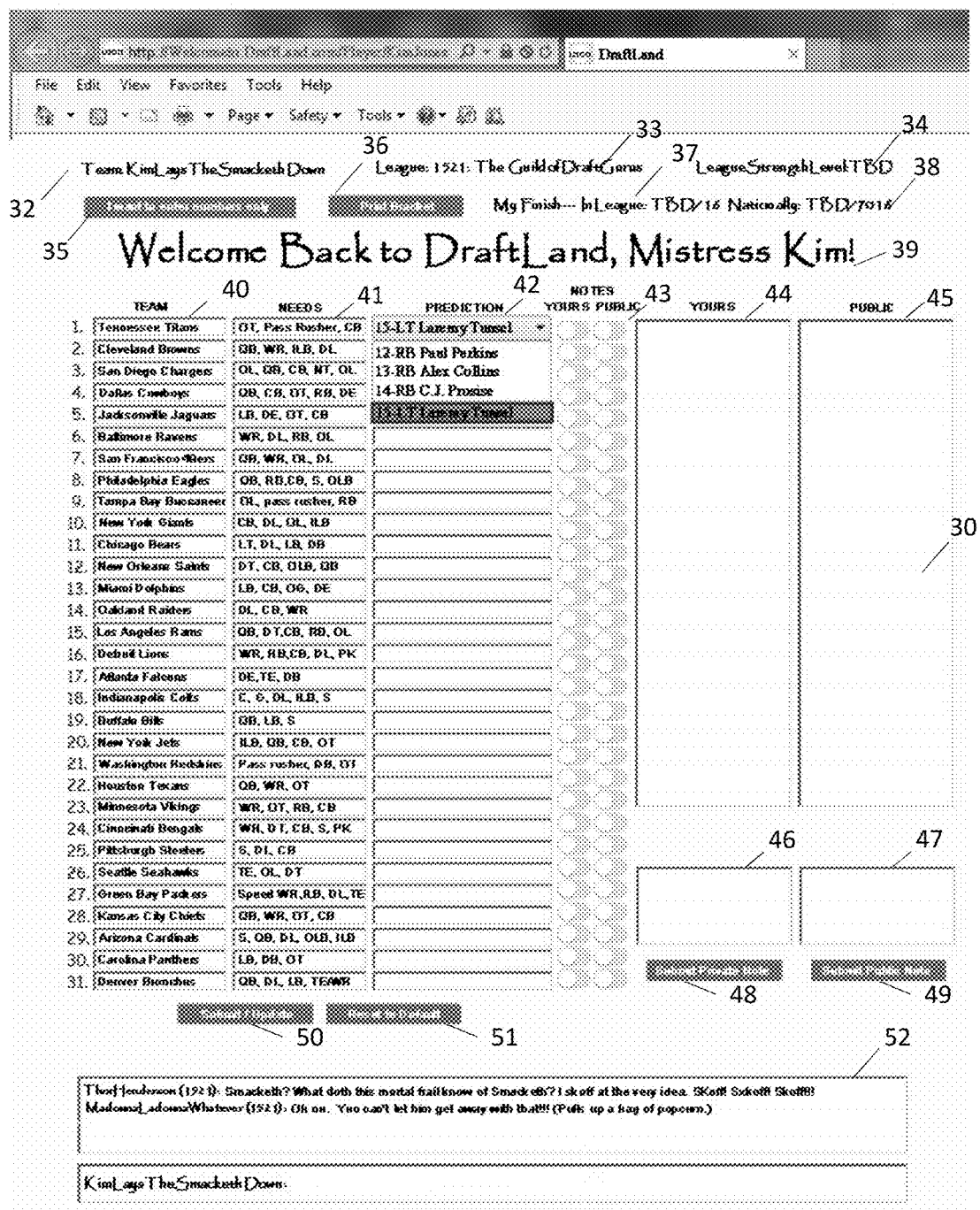
FIG. 8 is an exemplary embodiment of a mock draft bracket screen showing a player selecting a prospective player for a given slot for the online mock draft game according to the teachings of the present disclosure.

FIG. 8 is an exemplary embodiment of a mock draft bracket screen 30 showing a player selecting a prospective player for a given slot for the online mock draft game according to the teachings of the present disclosure. There is a drop down box shown in column 42 that allows the user to scroll through the likely players in the same numeric sequence they are in on the paper ballot. The user can work his/her way down the column 42 and fill in each data field to enter the player that each team shown in column 40 is predicted to draft to fill the need shown in column 41. This allows the user to speed up the submission process. Alternatively, the system may automatically display and/or fill in the data fields upon the entry of the players' initials or some other unique identifier.

Figure 9:
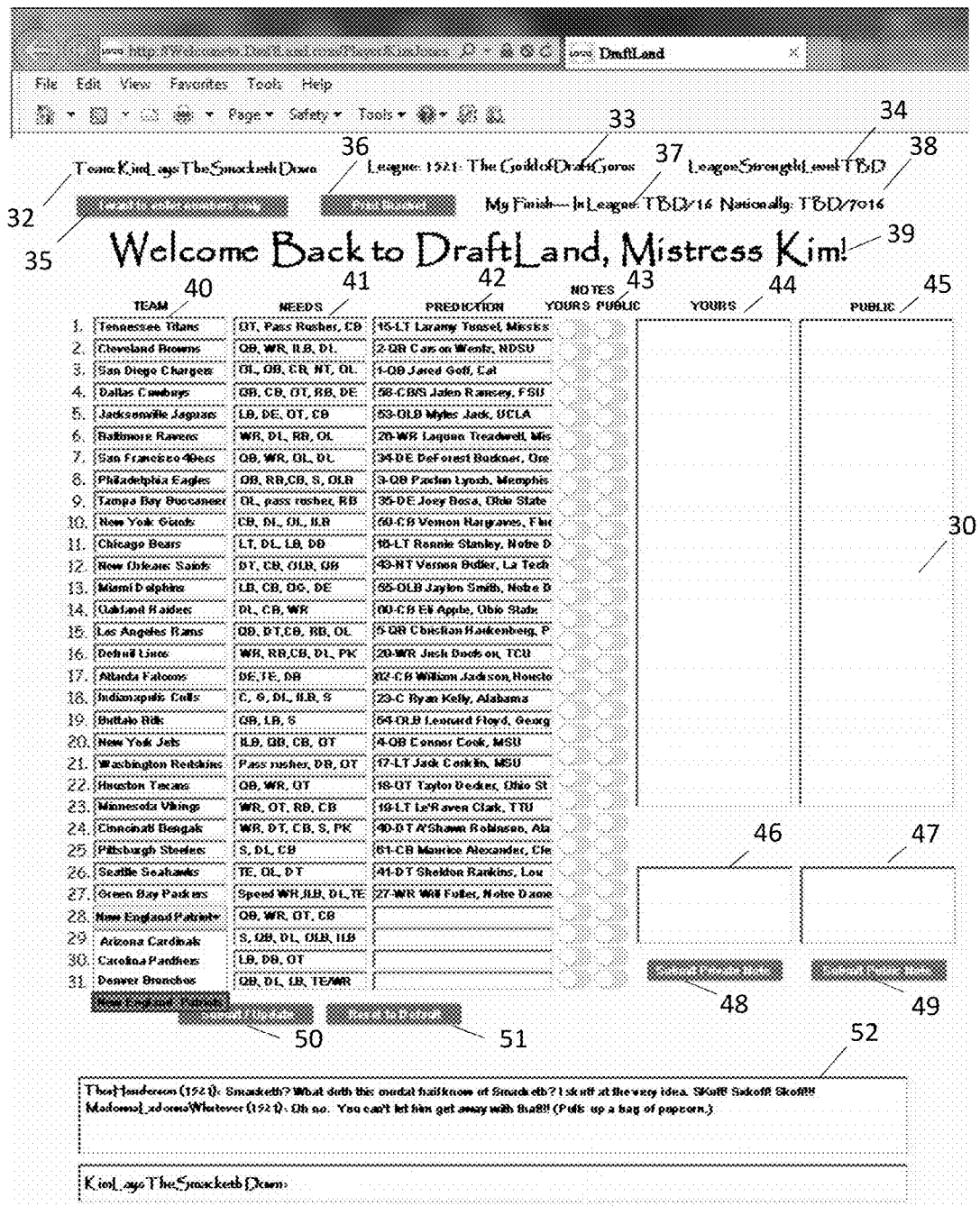
FIG. 9 is an exemplary embodiment of a mock draft bracket screen showing a player predicting a draft day trade for the online mock draft game according to the teachings of the present disclosure.

FIG. 9 is an exemplary embodiment of a mock draft bracket screen 30 showing a player predicting a draft day trade for the online mock draft game according to the teachings of the present disclosure. The system incorporates an innovative practice of rewarding prognosticators for predicting draft day picks. If users chose, they can utilize a drop down menu to auto-populate another NFL team in column 40 to input a team acquiring a draft pick.

Figure 10:
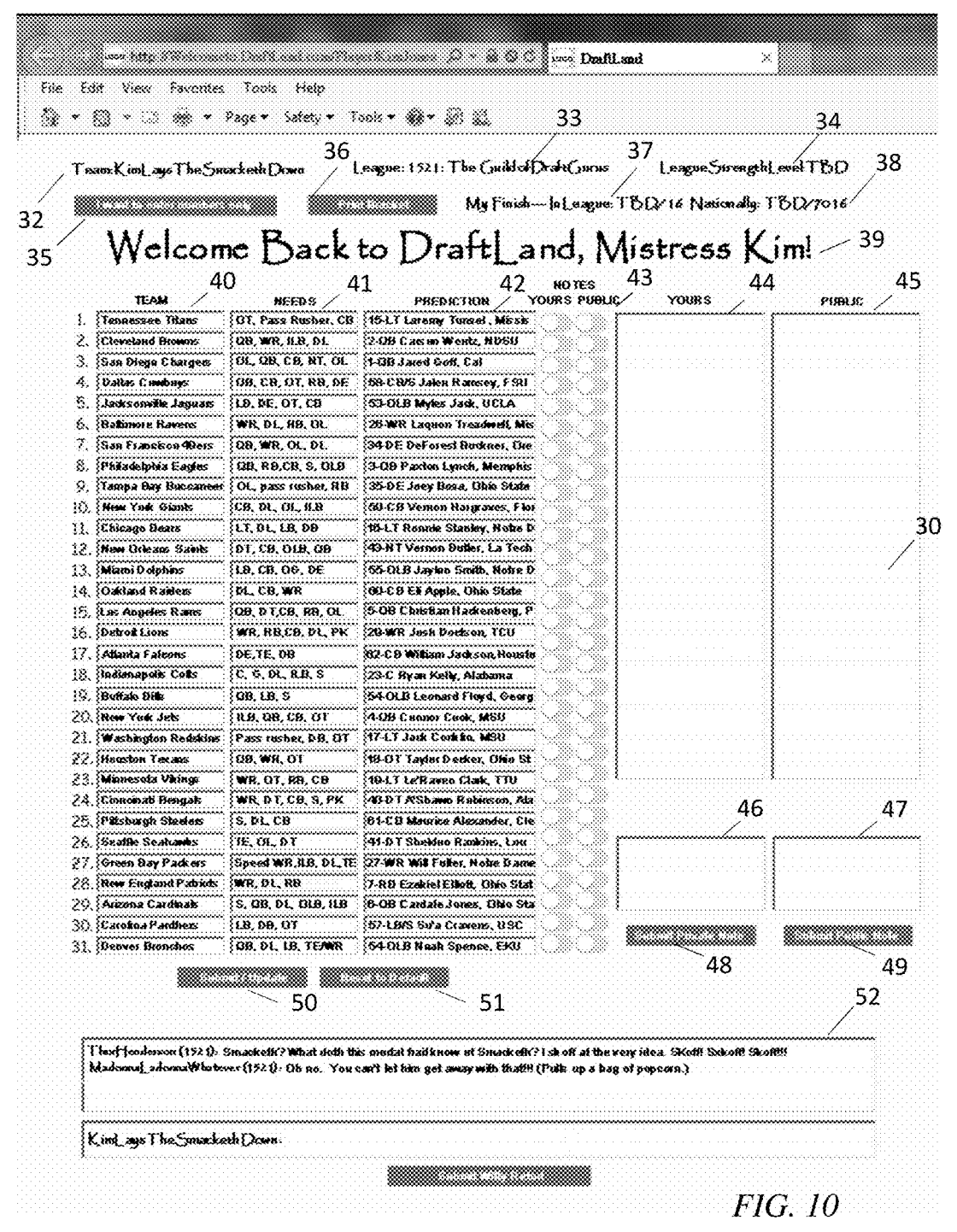

FIG. 10 is an exemplary embodiment of a mock draft bracket screen 30 showing a completed pick list for the online mock draft game according to the teachings of the present disclosure. It may be seen that all of the data fields in the prediction column 42 are filled in with players' names.

FIG. 11 is an exemplary embodiment of a mock draft bracket screen 60 showing a player using a novel numerical entry method for completing the pick list for the online mock draft game according to the teachings of the present disclosure. The printed paper bracket (or a dedicated screen that a user may access) opens the door for even a quicker entry method by assigning each prospect a unique identifier or number. The expedited bracket screen allows the entry of specific players using one or two digit numbers. To access this screen, click the "I want to enter numbers only button" 35 at the far left of the main bracket screen 30. Once on this expedited bracket screen, the default draft order (or your modified draft order) is shown along with those teams' needs and a prediction number fields. Users only need to enter the prospect identification number defined on the printed bracket for each predicted selection. If users have already entered some predictions, those prospect identification numbers will already be populated. There are three buttons at the bottom: the "Submit/Update" button 61 which overwrites whatever is on the server with what has just been listed on this page; the "Reset to Default" 62 which after the user confirms clicking this button intentionally will wipe out all predictions; and finally the "Return to Home" button 63, which returns the user to the main mock draft bracket page without saving changes after the confirmation that they do not want to save their changes.

Figure 12:
FIG. 12 is an exemplary embodiment of a mock draft bracket screen showing a player posting "smack talk" message for the online mock draft game according to the teachings of the present disclosure.

FIG. 12 is an exemplary embodiment of a mock draft bracket screen 30 showing a player posting "smack talk" message for the online mock draft game according to the teachings of the present disclosure. Part of the fantasy football experience that is so compelling is the ability to talk smack with your friends. At the bottom of the mock draft bracket screen 30 shown in FIG. 12, users posted comments and responses, thus enhancing the game's ability to leverage user competitive nature. There is a "Submit Witty Retort" button 66 at the bottom to allow users to respond to the smack talk and submit a response.

Figure 13:
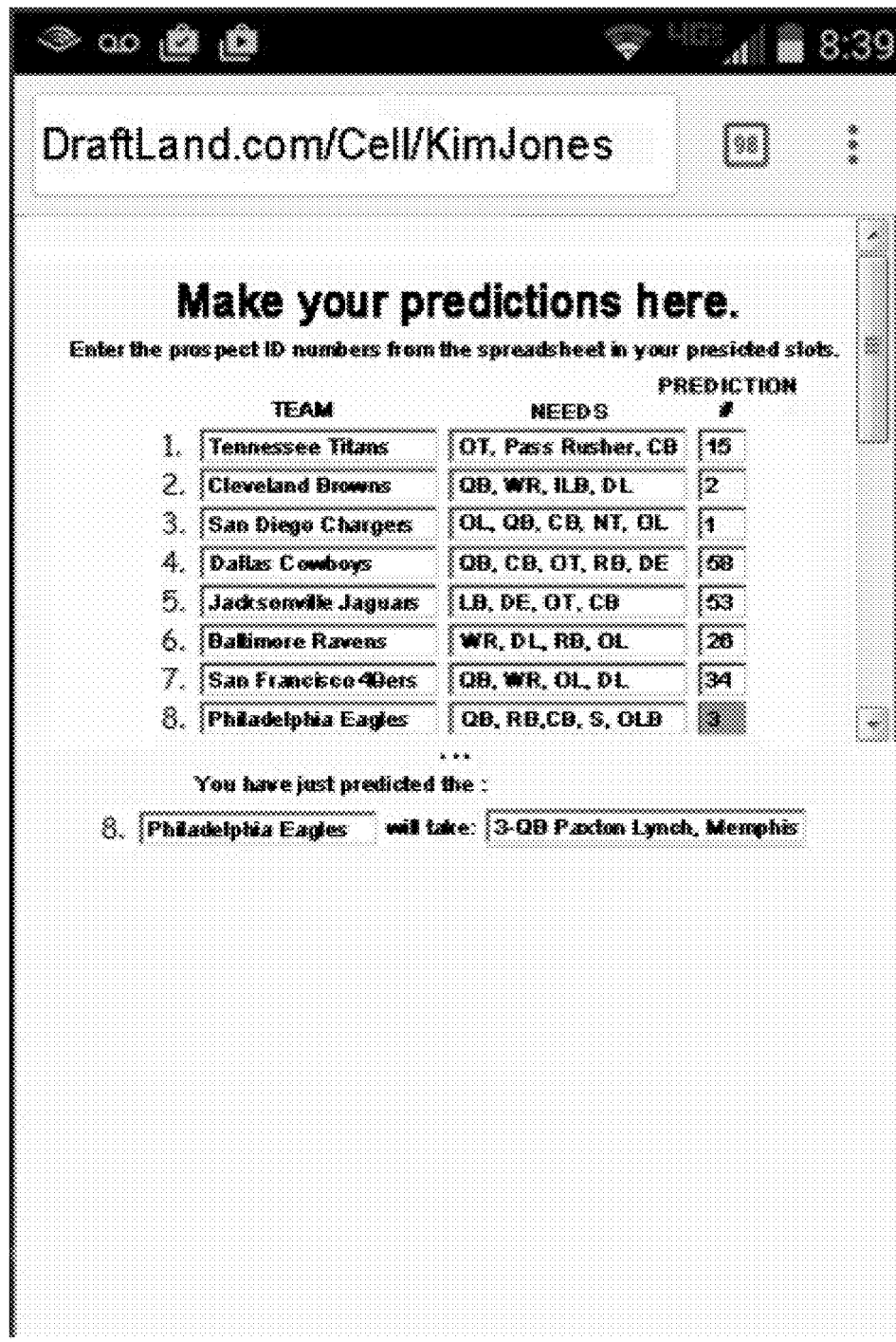
FIG. 13 is an exemplary embodiment of a mock draft bracket screen for a mobile device showing a player using a numerical entry method for completing the pick list for the online mock draft game according to the teachings of the present disclosure.

FIG. 13 is an exemplary embodiment of a mock draft bracket screen 70 for a mobile device showing a player using the numerical entry method for completing the pick list for the online mock draft game according to the teachings of the present disclosure. This is an identical pick entry method as that shown in FIG. 11 and described above.

Figure 14:
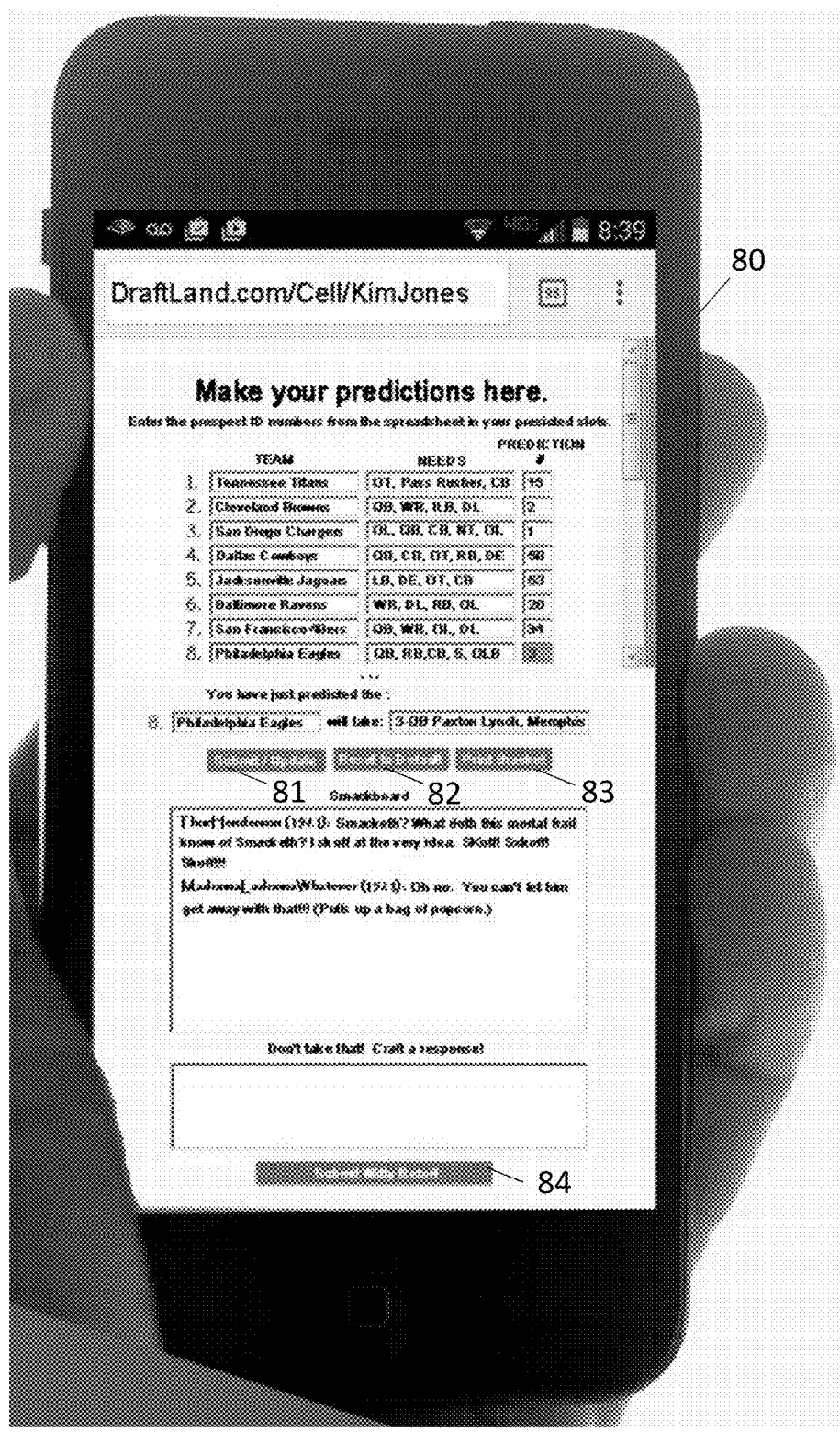
FIG. 14 is an exemplary embodiment of a professional sports mock draft challenge mobile device interface home page according to the teachings of the present disclosure.

FIG. 14 is an exemplary embodiment of a professional sports mock draft challenge mobile device interface mock draft bracket screen 80 according to the teachings of the present disclosure. This screen 80 combines the intuitiveness and keystroke efficiency of the expedited entry screen with many of the features on the main mock draft bracket screen, such as the smack talk feature. Different kinds of users have different focuses. The design anticipates that wireless mobile device users want speed, won't usually want to do methodical research (hence no notes), and will want to make immediate responses to smack talk. There are three buttons in the middle of the screen: the "Submit/Update" button 81 which overwrites whatever is on the server with what has just been listed on this page; the "Reset to Default" button 82 which after the user confirms clicking this button intentionally will wipe out all predictions; and finally the "Print Bracket" button 83 which enables the user to generate a PDF file that can be exported for printing. There is also a "Submit Witty Retort" button 84 at the bottom of the screen to allow users to respond to posted smack talk.

The Rules

The mock draft lists are presented online each year a predetermined time period prior to the appropriate professional sports draft, for example two months. Once a user has paid and logged into the mock draft game website, he/she is able to post notes, specify and modify their draft order, player draft predictions, etc.

All mock drafts must be finalized and saved at least five minutes prior to the official start of that round of the draft. Any unsaved picks at that point will be auto-saved and submitted at the five-minute mark.

Users will not be able to modify their picks for the current round of the draft once the actual draft begins.

The use of a database to track results will allow the innovation of awards and the awarding of such will drive participation in the online game.

In addition, there will be a form of monetary reward and/or special recognition given to the best finisher among all participants nationwide, as a driving factor to push participants to use the website portion of the game.

All participants may print out a certificate showing their ranking nationally, as well as one showing where they finished in their league.

The Scoring

Having a scoring system that is easily understood is a key to making the game popular. The scoring systems for this game are the first scoring structures developed for deep analysis of professional sports mock draft results. The default scoring system presented here rewards fans for knowing what trades may be coming and for knowing the general vicinity of the draft where prospects are likely to be taken. This scoring system is based on and rewards the fan's "knowledge of the prospects and the teams of the sports league." However, a group of participants may alter or customize the way points are awarded and deviate from the default scoring system for his/her group.

Using the NFL draft as an example, each game participant may select a prospect for each of the 32 slots in the first round of the NFL draft. When the draft results come in, each pick is assigned a score. These scores are totaled and the user with the highest combined score wins the game. The exemplary default scoring methodology is set forth below.

Correct pick of the prospect by the correct team at the correct slot=10 Points

The prospect selected at the right spot but the wrong picking team specified=5 points The prospect selected one slot earlier or later=5 points
The prospect selected two slots earlier or later=4 points
The prospect selected three slots earlier or later=3 points
The prospect selected four slots earlier or later=2 points
The prospect selected five slots earlier or later=1 points For example, RB Todd Gurley is picked at #12. Participant 1 picked him at #15. Participant 1 receives 3 points for this pick.

For example, RB Todd Gurley is picked at #12. Participant 2 picked him at #12. Participant 2 receives 10 points for this pick.

For example, RB Todd Gurley is picked at #12. Participant 3 picked him at #25. Participant receives 0 points for this pick.

For example, RB Todd Gurley is picked at #12 by Minnesota. Participant 4 picked him at #12, but specified on the page that the Jets would own that pick. Participant 4 gets 5 points for picking the prospect in the right slot even though he got the team wrong.

If a group of game participants wish to only award points for the correct pick of the prospect by the correct team at the correct slot or award different number of points for one or more categories, for example, the system is flexible to enable this group of participants to customize the scoring methodology to their preferences. An exemplary screen that enables the game participants to customize the scoring methodology is shown in FIG. 15.

The Trades

Pre-draft trades are a fly in the ointment to this game as they could frustrate more casual users. Luckily they are rare. A couple of rules are used to address pre-draft trades and incorporate in-draft trades into the fun.

Participants can specify that they think a team will acquire a certain pick during the draft. This is denoted by either writing it on the short form if playing on paper or using the drop down to change the team if specifying it on the website.

If the participant guesses a team acquires that pick and is correct, they get a bonus 5 points.

For example, RB Todd Gurley is picked at #12 by Minnesota. Participant 6 picked him at #12 and specified that the Vikings would acquire that pick in an in-draft trade. Participant 6 gets 10 points for picking the prospect in the right slot by the right team and gets another 5 for picking the trade correctly. A total of 15 points.

For example, RB Todd Gurley is picked at #12 by Minnesota. Participant 7 picked him at a different slot but did specify that the Vikings would acquire that pick in an in-draft trade. Participant 7 gets whatever points he may be due (if any) for potentially picking him in the right vicinity and gets another 5 for picking the trade correctly. For a total ranging from 5 points to 10 points.

To eliminate the potential of pre-draft trades made within 12 hours of the draft creating an unfair advantage for the unemployed, any pick traded within the 12 hours prior to the draft will be immediately locked when a trade is announced by the league—punishing the scores of all but the most plugged-in participants equally (who might successfully beat the lock down) to promote equality of play, but still allowing people to sign up prior to the start of the draft.

Should a position be locked for this reason, any brackets without a prospect specified will be populated by the statistically most likely prospect based on our participants predictions and then that slot will be locked.

Note: there will be variants of the scoring system that allow up to the last 5 minute updates.

Ties

In the event of a tie, tied prospects will default to be announced as tied for first.

If a league wants to have rules to resolve ties there are several options that can be configured in by that commissioner to specify an "overall winner via tiebreaker" (OWVT):

The number of correct picks.

The number of 5 point picks (one off picks and wrong team/right prospect picks)

The number of acquiring teams matched to the correct prospect

Sudden death OT: A playoff picking the first 10 picks of the next round. Any eligible tied participant not picking the next round would be disqualified from being the OWVT.

The features of the present invention which are believed to be novel are set forth below with particularity in the appended claims. However, modifications, variations, and changes to the exemplary embodiments described above will be apparent to those skilled in the art, and the system and method described herein thus encompasses such modifications, variations, and changes and are not limited to the specific embodiments described herein.

What is claimed is:

1. A fantasy sports mock draft online game portal comprising:
   at least one database coupled to a global computer network and configured to store data associated with a plurality of game participants, a plurality of sports teams of at least one sports league, and a plurality of draft prospects for the plurality of sports teams;
   a webserver configured to be accessible via the Internet, and in communication with the at least one database, the webserver storing a plurality of web pages, including one depicting a mock draft bracket web page listing the plurality of sports teams and corresponding needs of each sports team, the webserver being configured to receive game participant draft pick entries specifying draft prospects for the plurality of sports teams and a certain draft order, and storing the drafts pick entries and draft order in the at least one database, the webserver further configured to:
   display a web page receiving game participant group information and storing the group information in the at least one database;
   display a public note field and a private note field configured to receive and display commentary input from game participants for public and private viewing; and
   the webserver being further configured to compute a score for each of the plurality of game participants based on the draft pick entries in response to a scoring methodology wherein points are awarded based on a number of correct picks for the slots in the draft order for a draft prospect, and how far draft prospects are picked away from the correct slots, the webserver further configured to select a winner from among the plurality of game participants based on the computed scores.

2. The fantasy sports mock draft online game portal of claim 1, wherein the webserver is configured to receive draft pick entries identifying draft prospects using one of numerical identifiers and names.

3. The fantasy sports mock draft online game portal of claim 1, wherein the webserver further stores a plurality of web pages optimized for display and receive data entry on a mobile device.

4. The fantasy sports mock draft online game portal of claim 1, wherein the webserver further stores a plurality of web pages optimized for display and receive data entry on a wearable computing device.

5. The fantasy sports mock draft online game portal of claim 1, wherein the webserver further stores at least one static web page listing the plurality of sports teams, corresponding needs of each sports team, and names and numerical identifiers of a plurality of draft prospects, the at least one static web page being optimized for printing on a standard size sheet of paper.

6. The fantasy sports mock draft online game portal of claim 1, the webserver being further configured to compute a score for each of the plurality of game participants in response to one of a customized scoring methodology configured by the plurality of game participants, and a default scoring methodology wherein points are awarded for a correct slot in the draft order for a draft prospect, a correct draft prospect for a sports team, and how close a draft pick prospect is to the correct slot in the draft order.

7. The fantasy sports mock draft online game portal of claim 1, the webserver being further configured to compute a score for each of the plurality of game participants based on a default scoring methodology where a highest score H is given for a draft prospect pick by the correct sports team in the correct slot in the draft order, a deduction from H is taken for a draft prospect pick in correct slot but the wrong sports team, and deductions from H are taken for a draft prospect pick in one or more slots earlier or later than the correct slot.

8. The fantasy sports mock draft online game portal of claim 1, the webserver being further configured to compute a score for each of the plurality of game participants based on a default scoring methodology where:
 a draft prospect pick by the correct sports team in the correct slot in the draft order=10 Points;
 a draft prospect pick in correct slot but the wrong sports team=5 points;
 a draft prospect pick in one slot earlier or later than correct slot=5 points;
 a draft prospect pick in two slots earlier or later than correct slot=4 points;
 a draft prospect pick in three slots earlier or later than correct slot=3 points;
 a draft prospect pick in four slots earlier or later than correct slot=2 points;
 a draft prospect pick in five slots earlier or later than correct slot=1 points.

9. The fantasy sports mock draft online game portal of claim 1, the webserver being further configured to resolve a tie between two or more game participants based on at least one of: number of correct picks, number of 5 point picks, and number of acquiring teams matched to the correct draft prospect.

10. A fantasy sports mock draft online game portal of claim 1, wherein the webserver is further configured to display a web page receiving game participant profile information and storing the profile information in the at least one database.

11. A fantasy sports mock draft online game portal of claim 1, wherein the webserver is further configured to display a web page receiving game participant payment information and storing the payment information in the at least one database.

12. A fantasy sports mock draft online game methodology comprising:
 displaying and providing a plurality of game participants access, via a global computer network, to a plurality of web pages stored in a webserver, including a web page depicting a mock draft bracket web page listing a plurality of sports teams of a sports league and corresponding needs of each sports team;
 displaying data entry fields for receiving game participant draft pick entries specifying draft prospects for the plurality of sports teams and a certain draft order, and storing the drafts pick entries and draft order in a database;
 displaying a public note field and a private note field configured to receive and display commentary input from game participants for public and private viewing;
 determining a score for each of the plurality of game participants based on the draft pick entries in response to a scoring methodology wherein points are awarded for a correct slot in the draft order for a draft prospect and how far away from the correct time slot, the webserver further configured to select a winner from among the plurality of game participants based on the computed scores.

13. The fantasy sports mock draft online game methodology of claim 12, further comprising:
 receiving and processing payment information from the plurality of game participants; and
 enabling access to a web page depicting a mock draft bracket web page listing a plurality of sports teams of a sports league, corresponding needs of each sports team, and data fields configured to receive pick entries of mock draft prospects.

14. The fantasy sports mock draft online game methodology of claim 12, further comprising prompting for and receiving login credentials from a paid game participant.

15. The fantasy sports mock draft online game methodology of claim 12, further comprising receiving draft pick entries identifying draft prospects using one of numerical identifiers and names.

16. The fantasy sports mock draft online game methodology of claim 12, further comprising storing and providing access to a plurality of web pages optimized for display and receive data entry on a mobile or wearable computing device.

17. The fantasy sports mock draft online game methodology of claim 12, further comprising storing and providing access to a web page listing the plurality of sports teams, corresponding needs of each sports team, and names and numerical identifiers of a plurality of draft prospects, the web page optimized for printing on a standard size sheet of paper.

18. The fantasy sports mock draft online game methodology of claim 12, further comprising storing and providing access to a web page listing the plurality of sports teams in a default draft order, corresponding needs of each sports team, and displaying a pull-down list of names of a plurality of draft prospects for populating a list of draft pick entries for the sports teams in the default draft order.

19. The fantasy sports mock draft online game methodology of claim 12, further comprising:
storing and providing access to a web page listing the plurality of sports teams in a particular draft order, corresponding needs of each sports team;
receiving, from a game participant, input to change the draft order; and
displaying a pull-down list of names of a plurality of draft prospects for populating a list of draft pick entries for the sports teams in the changed draft order.

20. The fantasy sports mock draft online game methodology of claim 12, further comprising computing a score for each of the plurality of game participants in response to one of a customized scoring methodology configurable by the plurality of game participants, and a default scoring methodology wherein points are awarded for a correct slot in the draft order for a draft prospect, a correct draft prospect for a sports team, and how close a draft pick prospect is to the correct slot in the draft order.

21. The fantasy sports mock draft online game methodology of claim 12, further comprising computing a score for each of the plurality of game participants based on a default scoring methodology where a highest score H is given for a draft prospect pick by the correct sports team in the correct slot in the draft order, a deduction from H is taken for a draft prospect pick in correct slot but the wrong sports team, and deductions from H are taken for a draft prospect pick in one or more slots earlier or later than the correct slot.

22. The fantasy sports mock draft online game methodology of claim 12, further comprising computing a score for each of the plurality of game participants based on a default scoring methodology where:
a draft prospect pick by the correct sports team in the correct slot in the draft order=10 Points
a draft prospect pick in correct slot but the wrong sports team=5 points;
a draft prospect pick in one slot earlier or later than correct slot=5 points;
a draft prospect pick in two slots earlier or later than correct slot=4 points;
a draft prospect pick in three slots earlier or later than correct slot=3 points;
a draft prospect pick in four slots earlier or later than correct slot=2 points;
a draft prospect pick in five slots earlier or later than correct slot=1 points.

23. The fantasy sports mock draft online game methodology of claim 12, further comprising resolving a tie between two or more game participants based on at least one of: number of correct picks, number of 5 point picks, and number of acquiring teams matched to the correct draft prospect.

24. The fantasy sports mock draft online game methodology of claim 12, further comprising displaying a web page configured to receive game participant profile information and storing the profile information in the database.

25. A fantasy sports mock draft online game methodology of claim 12, further comprising displaying a web page configured to receive game participant group information and storing the group information in the at least one database.

26. A fantasy sports mock draft online game methodology of claim 12, further comprising displaying a web page configured to receive game participant payment information and storing the payment information in the at least one database.

27. A non-transitory computer-readable medium having encoded thereon a fantasy sports mock draft online game methodology comprising:
displaying and providing a plurality of game participants access, via a global computer network, to a plurality of web pages stored in a webserver, including a web page depicting a mock draft bracket web page listing a plurality of sports teams of a sports league and corresponding needs of each sports team;
displaying data entry fields for receiving game participant draft pick entries specifying draft prospects for the plurality of sports teams and a certain draft order, and storing the drafts pick entries and draft order in a database;
displaying a public note field and a private note field configured to receive and display commentary input from game participants for public and private viewing; and
determining a score for each of the plurality of game participants based on the draft pick entries in response to one of a customized scoring methodology configured by the plurality of game participants, and a default scoring methodology wherein points are awarded for a correct slot in the draft order for a draft prospect and how far away from the correct time slot, the webserver further configured to select a winner from among the plurality of game participants based on the computed scores.

* * * * *